United States Patent [19]

May et al.

[11] Patent Number: 4,510,352

[45] Date of Patent: Apr. 9, 1985

[54] TROLLEY POLE

[75] Inventors: Francis A. May, Pittsburgh; Larry Patts, McMurray, both of Pa.

[73] Assignee: Consolidation Coal Company, Pittsburgh, Pa.

[21] Appl. No.: 409,648

[22] Filed: Aug. 19, 1982

[51] Int. Cl.³ .............................................. B60L 5/12
[52] U.S. Cl. ........................................ 191/64; 191/70
[58] Field of Search ...................... 191/64, 66, 68, 70; 362/32, 278, 320, 427, 428

[56] References Cited

U.S. PATENT DOCUMENTS

| 555,571 | 3/1896 | Finson | 191/64 |
|---|---|---|---|
| 699,927 | 5/1902 | McCullough | 191/64 |
| 885,063 | 4/1908 | Loudon | 191/64 |
| 1,468,265 | 9/1923 | Hamric | 191/64 |
| 1,743,300 | 1/1930 | Wilkins | 191/64 |
| 1,787,013 | 12/1930 | Moore | 191/64 |
| 1,867,480 | 7/1932 | Tillinghast | 191/64 |
| 2,265,018 | 12/1941 | Arnold | 191/64 |
| 2,616,992 | 11/1952 | Lewis | 191/70 |
| 2,644,862 | 7/1953 | Johnson, Jr. | 191/64 |
| 4,116,312 | 9/1978 | Adler et al. | 191/64 |

FOREIGN PATENT DOCUMENTS 28525 of 1904 United Kingdom ................. 191/66

Primary Examiner—Robert B. Reeves
Assistant Examiner—David F. Hubbuch
Attorney, Agent, or Firm—William A. Mikesell, Jr.; Stanley J. Price, Jr.; John M. Adams

[57] ABSTRACT

A hollow trolley pole associated with an electrically propelled vehicle has an upper end portion and a lower end portion. A passageway extends downwardly through the trolley pole from the upper end portion to the lower end portion. A trolley wire contact shoe is mounted on the pole upper end portion and slides along an electric power line or trolley wire that is suspended, for example, from a mine roof in an underground mine. An electrical conductor extends from the contact show through the passageway to the lower end portion of the pole which is received within a socket-like connector which is spring mounted in a base member connected to the vehicle frame. The conductor is enclosed within an impact resistant flexible conduit that extends from the passageway in the lower end portion of the pole through the connector and the base member and into a contactor box for connection to a propulsion motor. The conductor is completely enclosed so that it is not exposed to the effects of physical damage from the point it exits the trolley pole and is connected to a circuit breaker on board the vehicle. The circuit breaker is normally maintained in a closed position to provide a continuous flow of current from the trolley wire through the electrical conductor to the propulsion motor. In the event of a short or overload, the circuit breaker trips to interrupt the flow of current through the electrical conductor to the propulsion motor.

11 Claims, 4 Drawing Figures

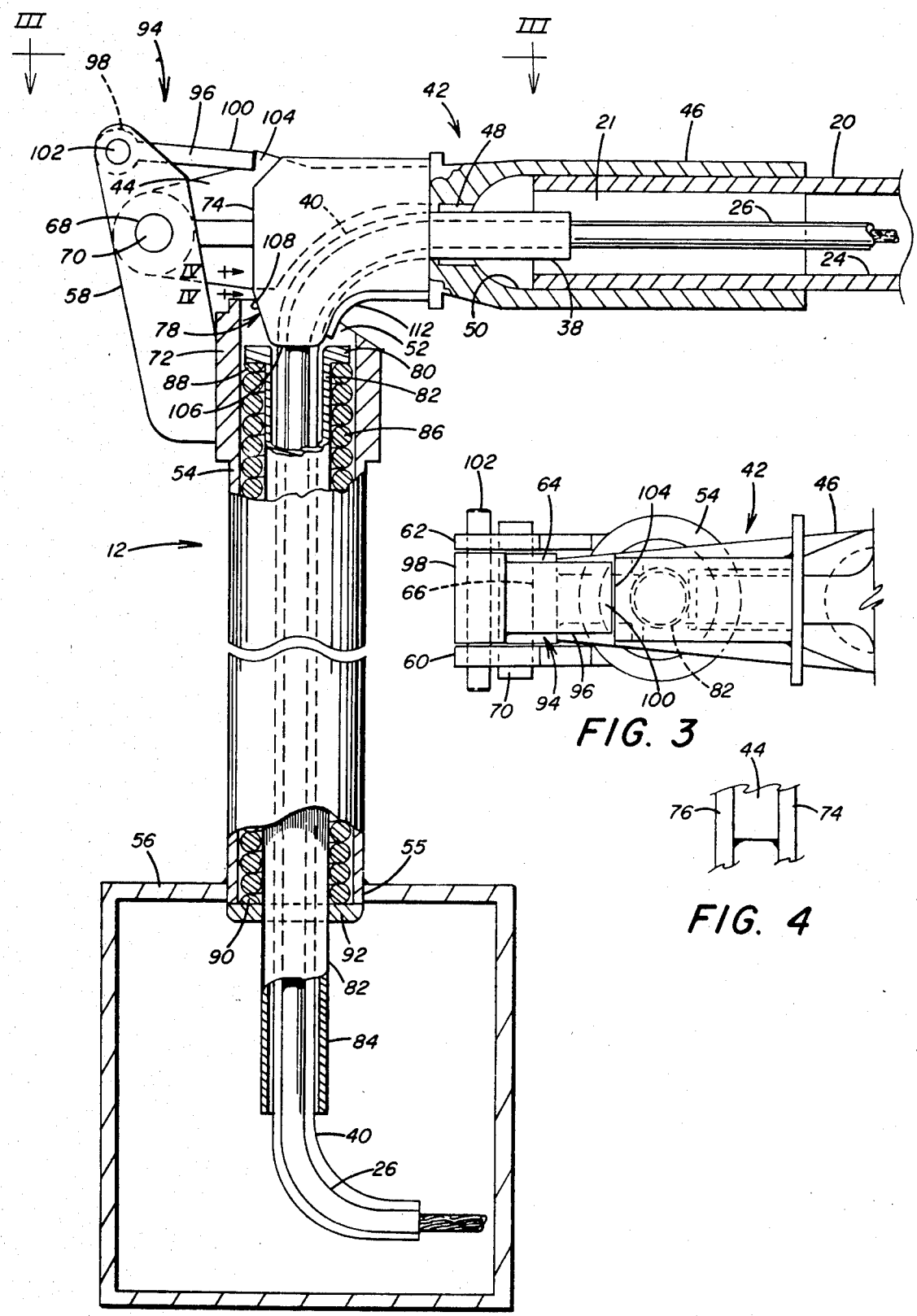

TROLLEY POLE

BACKGROUND OF THE INVENTION

1. Field of the Invention

This invention relates to a trolley pole assembly and more particularly to a trolley pole having a hollow construction for housing an electrical conductor in a protective enclosure extending from the connection of the conductor to the trolley wire at one end and to a propulsion motor at the opposite end.

2. Description of the Prior Art

It is well known, in underground mining operations, to utilize electrically propelled vehicles, such as locomotives, jeeps, portal buses and the like, having a trolley pole connection between an overhead trolley wire and the propulsion motor on the vehicle. Direct current is supplied from the overhead trolley wire to an electrical conductor supported by the trolley pole. The conductor extends along the trolley pole into electrical connection with the propulsion motor on the vehicle. For many years, it was the conventional practice to utilize solid wooden trolley poles for feeding the conductor from contact with the trolley wire to the propulsion motor. More recently, the use of trolley poles fabricated of an electrically insulated material, such as filament-wound fiberglass reinforced plastic, has been adopted in which the trolley pole has a hollow construction for feeding the conductor down through the trolley pole as opposed to supporting the conductor externally on the trolley pole.

U.S. Pat. No. 4,116,312 discloses a hollow fiberglass trolley pole which contains the electrical conductor and a fuse case so as to enclose the conductor and seal it from the deleterious effects of moisture, corrosion and breakage. The conductor is positioned in the pole and is connected to one end of a fuse which is also contained in the pole. The opposite end of the fuse is connected to another electrical conductor that extends out of an opening in the side of the pole. From the pole, the electrical conductor extends to an electric motor that drives the vehicle on which the pole is mounted. The pole is mounted in a socket on the vehicle.

U.S. Pat. No. 1,867,480 discloses a trolley pole made of flexible, insulating material, such as rubber, which permits bending of the pole, when the pole strikes an obstruction. The pole includes a longitudinal passageway for receiving the conductor. The conductor enters the pole through an opening at the upper end portion of the pole, and the wire exits the pole through an opening at the lower end of the pole. With this arrangement, the pole forms an insulating housing for the conductor, but the conductor is nevertheless still exposed at the upper and lower ends of the pole.

U.S. Pat. No. 2,265,018 also discloses a trolley pole construction that includes, in one embodiment, a thin-walled, tapered, metallic tube, having a hollow reinforcing core of wood in which the electrical conductor is positioned. The pole is positioned in a socket of a base mounted on the vehicle. The conductor extends downwardly through the insulated core and out through the lower end of the socket. The conductor is exposed as it extends to the propulsion motor of the vehicle. Further embodiments of the trolley pole illustrated in U.S. Pat. No. 2,265,018, include an external rather than internal reinforcing member fabricated of a resilient material around the trolley pole.

U.S. Pat. No. 2,644,862 discloses a trolley pole insulating material that includes a covering of cotton impregnated with rubber or plastic material or, in the alternative, a protective coating of liquid plastic material, such as polyethylene to the outer surface of a trolley pole tube to provide a weather-resistant coating around the pole.

U.S. Pat. Nos. 699,927; 1,468,265; 1,743,300; and 1,787,013 also disclose trolley poles of a tubular construction in which the electrical conductor passes through the trolley pole.

There is need for trolley pole apparatus which provides a sealed path for the conveyance of the electrical conductor from the contact shoe through the trolley pole and from the end of the trolley pole to the point of electrical connection of the conductor to the propulsion motor. While it has been suggested to position the conductor within an electrically insulated trolley pole, the prior art devices do not provide a sealed path for the electrical conductor that extends along the entire path from the contact shoe to the connection at the propulsion motor. With the known arrangements, the electrical conductor is exposed to the effects of moisture and is subject to physical damage. Therefore, there is need for a trolley pole assembly in which the electrical conductor is maintained in a protective enclosure from the point where the conductor passes out of the trolley pole to the point of connection to the propulsion motor.

SUMMARY OF THE INVENTION

This invention relates to a trolley pole assembly that includes a hollow pole having an upper end portion and a lower end portion. A passageway extends the length of the pole from the upper end portion to the lower end portion. A trolley wire contact shoe is mounted on the pole upper end portion. A base member supports the pole for movement of the trolley wire contact shoe into and out of contact with a trolley wire. The base includes a tubular housing having a bracket positioned adjacent the pole lower end portion. Connector means connects the pole lower end portion to the base member. The connector means is pivotally connected to the bracket and receives the pole lower end portion. An electrical conductor extends from connection to the trolley wire contact shoe at the pole upper end portion through the pole passageway to the pole lower end portion. The electrical conductor extends from the pole lower end portion through the connector means and the base member. An upper end of a flexible conduit is positioned in the pole passageway. A lower end of the flexible conduit extends out of the pole lower end portion and through the connector means and the base member. The electrical conductor is sealingly enclosed within the flexible conduit along the entire path of the electrical conductor from the trolley pole through the base member.

The flexible conduit provides a sealed path for the electrical conductor from the trolley pole and through the trolley pole base to the point of electrical connection of the conductor to the propulsion motor. With this arrangement, not only is the electrical conductor sealed from the effects of moisture but is also protected against physical damage at the point where the conductor extends from the base of the trolley pole.

The flexible conduit surrounding the electrical conductor extends from the passageway in the lower end portion of the trolley pole through a passageway of the connector means which has a socket-like housing. The connector means receives the lower end portion of the trolley pole at one end and is pivotally connected at an opposite end to the upper end of the base member. The passageway of the socket-like housing communicates with a passageway that extends through the tubular housing of the base member. From the base member the flexible conduit extends to the point where the conductor is connected to the circuitry of the propulsion motor. Thus, the electrical conductor is retained in a moisture proof enclosure at the critical point where the conductor extends from the trolley pole to the point of connection to the propulsion motor.

The connector means is resiliently mounted in the base member. A coiled spring is positioned in the tubular housing of the base member. The coiled spring surrounds the flexible conduit and abuts at one end a flanged end of a sleeve that extends through the spring and the base member. The opposite end of the spring abuts the lower end of the base member. The sleeve extends and retracts relative to the lower end of the base member under the action of the spring. The spring exerts an upward force upon the trolley pole to normally maintain the trolley pole in a raised position so that the contact shoe slides on the trolley wire.

Accordingly, the principal object of the present invention is to provide a trolley pole assembly that provides a protective enclosure for an electrical conductor from the contact shoe to the point of connection to the propulsion motor on the vehicle.

Another object of the present invention is to provide a trolley pole, resiliently mounted on a base secured to a vehicle in which the electrical conductor is retained in a moisture proof passageway that extends from the base of the trolley pole to the point of connection to the propulsion motor on the vehicle.

A further object of the present invention is to provide a tubular trolley pole mounted on a base which resiliently supports the trolley pole to maintain a contact shoe at the end of the pole in contact with a trolley wire.

These and other objects of the present invention will be more completely disclosed and described in the following specification, the accompanying drawings and the appended claims.

BRIEF DESCRIPTION OF THE DRAWINGS

FIG. 2 is an enlarged, fragmentary, sectional view of the base for the trolley pole shown in FIG. 1 illustrating a flexible conduit sealingly enclosing the conductor.

FIG. 3 is a plan view of the trolley pole base, taken along line III—III of FIG. 2.

FIG. 4 is a side view of the trolley pole base, taken along line IV—IV of FIG. 2.

DESCRIPTION OF THE PREFERRED EMBODIMENT

Figure 1:
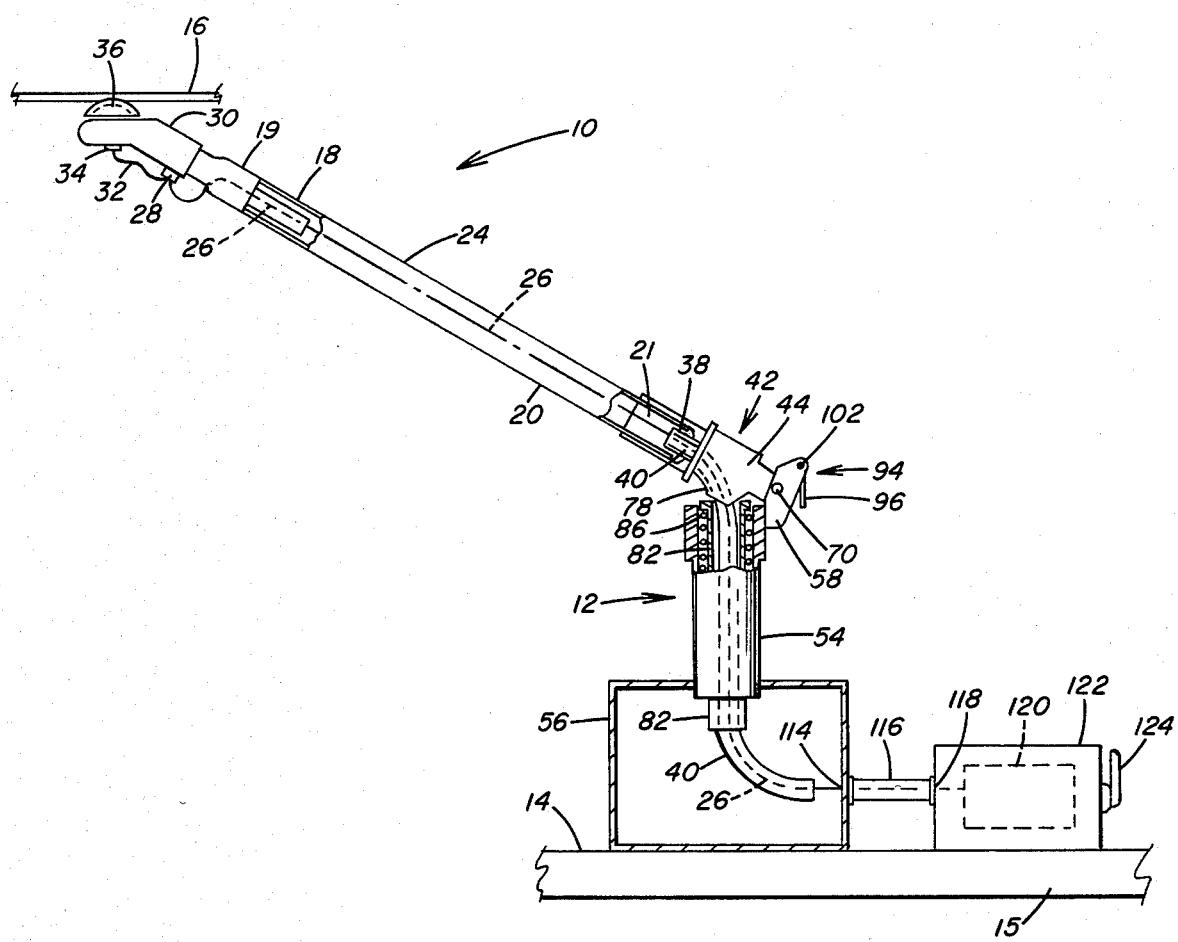
FIG. 1 is a fragmentary, schematic view of a trolley pole, resiliently mounted on a vehicle and including an internal passage for an electrical conductor, illustrating a flexible conduit for sealing the conductor in a protective enclosure.

Referring to the drawings and particularly to FIG. 1, there is illustrated a trolley pole generally designated by the numeral 10 resiliently mounted on a base 12 which is secured to a frame 14 of an electrically powered vehicle 15, such as a portal bus, used in an underground mine to transport personnel to various locations in the mine. A trolley wire 16 is positioned in the mine passageway adjacent the mine roof. The trolley pole 10 provides a path for the flow of direct current from the trolley wire 16 to the propulsion motor on the vehicle 15. The trolley pole 10 is fabricated of an electrically insulated material, such as fiberglass, plastic, a polycarbonate material, or the like, having a tubular configuration and includes an upper end portion 18 and a lower end portion 20. The upper end portion 18 includes a rigid harp insert 19, and the lower end portion 20 includes a rigid bottom pole insert 21.

The trolley pole 10 has a hollow construction in which an internal passageway 24 extends from the upper end portion 18 to the lower end portion 20. An electrical conductor 26 is positioned in the passageway 24 and is connected at the pole upper end portion 18 to a fastener 28 secured to a harp 30 which is mounted on the rigid harp insert 19. A flexible conductor 32 extends from fastener 28 to a fastener 34 which is positioned on the harp 30 in electrical contact with a contact shoe 36. The contact shoe 36 slides along the trolley wire 16 so that current is transmitted from the trolley wire 16 to the contact shoe 36 and flexible conductor 32 to the electrical conductor 26 within the trolley pole 10. As illustrated in FIG. 1, the electrical conductor 26 extends through a sealed opening in the trolley pole upper end portion 18 adjacent the fastener 28 on the harp 30 for external connection to fastener 28. It should also be understood that the conductor 26 can be connected internally within the pole 10 to the fastener 28 without the conductor 26 extending out of the passageway 24.

The electrical conductor 26 extends through the trolley pole passageway 24 and into an upper end 38 of a flexible conduit 40 that encloses the conductor 26 within an impact resistant enclosure from the point where the conductor 26 exits the pole lower end portion 20 to the point where the conductor 26 is electrically connected to the circuitry associated with the propulsion motor for the vehicle 15. Preferably, the conduit 40 is fabricated of an electrically insulated material, which is flexible, such as plastic or the like. The flexible conduit 40 extends from the bottom pole insert 21 which is in pole lower end portion 20 into a pole connector generally designated by the numeral 42 that is pivotally and spring mounted on the tubular base member 12.

The pole connector 42 includes a pivot end portion 44 and a socket end portion 46. A passageway 48 extends from the socket end portion 46 to the pivot end portion 44, and the flexible conduit 40, with the electrical conductor 26 contained therein, extends through the connector passageway 48. As seen in greater detail in FIG. 2, the socket end portion 46 has an internal bore 50 that securely receives the pole lower end portion 20. The bore 50 communicates with the passageways 24 and 48. The passageway 48 follows an arcuate path from the bore 50 to the pivot end portion 44 where the passageway 48 communicates with an internal bore 52 of a tubular housing 54 of the base member 12.

The connector first end portion 44 is pivotal on the upper end of the tubular housing 54. The lower end of the tubular housing 54 is secured in an opening 55 of a suitable support 56 mounted on the vehicle frame 14 as illustrated in FIG. 1. In one embodiment, the support 56, as illustrated in FIG. 1, is a contactor box that houses the circuitry for the electrical connection of the conductor 26 to the propulsion motor of the vehicle 15. As will be explained later in greater detail, the conductor 26 extends from the base member 12 through the contactor box 56 to a circuit breaker 120 operable to interrupt the current flow from the trolley wire 16 to the propulsion motor in the event of a short or an overload.

As illustrated in FIGS. 2 and 3, the tubular housing 54 of the base member 12 includes a bracket 58 formed by a pair of arms 60 and 62. The pivot end portion 44 of the pole connector 42 includes a boss 64 having a bore 66 extending therethrough. The bore 66 is aligned with oppositely positioned openings 68 through the arms 60 and 62 for receiving a pivot pin 70. With this arrangement, the trolley pole 10 is pivotal on the base member 12 about the pivot pin 70.

The base member 12 has an open upper end portion 72 that communicates with the bore 52. The pole connector 42 includes a pair of plate members 74 and 76 shown in FIG. 4 positioned oppositely of the open end portion 72 to form a cam generally designated by the numeral 78. The cam 78 abuts a flanged upper end 80 of a sleeve 82 that extends from the base member upper end portion 72 through a lower open end portion 84 of the base member 12. The cam 78 is maintained in contact with the flanged upper end portion 80 by the action of a coiled spring 86, which is positioned in the tubular housing 54 in surrounding relation with the sleeve 82.

The coiled spring 86 is resiliently positioned within the tubular housing 54 and includes an upper end portion 88 abutting the sleeve flanged upper end 80 and a lower end portion 90 abutting a bottom wall 92 of the base member 12. The coiled spring 86 is compressed between the flanged upper end 80 and the bottom wall 92. The sleeve 82 is extensible and retractable relative to the base member 12 under the action of the coiled spring 86. The sleeve 82 is shown fully extended from the lower end of the base member 12 in FIG. 2. The position of the sleeve 82 shown in FIG. 2 corresponds to the lowered position of the trolley pole 10 removed from contact with the trolley wire 16. When the trolley pole 10 is in contact with the trolley wire 16, the sleeve 82 is moved upwardly in the base member 12 by expansion of the spring 86. The relative position of the sleeve 82 in the base member 12 is determined by the pivoted position of the cam 78. As illustrated in FIG. 2, with the trolley pole 10 in the lowered position, the cam 78 is pivoted to move the sleeve 82 downwardly in the base member 12 and fully compress the spring 86. In this position, a substantial length of the sleeve 82 extends from the lower end of the tubular housing 54.

To maintain the trolley pole 10 in the lowered position, the pole connector 42 is provided with a locking device generally designated by the numeral 94, in FIG. 2. The locking device 94 includes a locking bar 96 having a pivot end portion 98 and an abutment end portion 100. The pivot end portion 98 includes a bore, which is aligned with bores in the upper end portions of the bracket arms 60 and 62 for receiving a pivot pin 102. The bar 96 is pivotal about the pin 102 to move the abutment end portion 100 into and out of contact with a shoulder 104 on the pole connector 42. The bar 96 is shown engaging the shoulder 104 in FIGS. 2 and 3 and disengaged from the shoulder 104 in FIG. 1.

To permit the pole 10 to pivot upwardly for engagement of the contact shoe 36 with the trolley wire 16, the locking bar 96 is pivoted out of contact with the shoulder 104 and moved to the position illustrated in FIG. 1. Releasing the trolley pole 10 from the locked position permits expansion of the coiled spring 86 to move the sleeve 82 upwardly within the tubular housing 54. As the pole connector 42 pivots on the bracket 58, the cam 78 formed by the plates 74 and 76 pivots counterclockwise for the arrangement shown in FIG. 2 and a protuberance 106 formed by the plates 74 and 76 moves out of alignment with the open end of the sleeve 82. A cam surface 108 of cam 78 moves into contact with the sleeve flanged upper end 80 and the sleeve 82 is moved upwardly by the spring 86. During the upper and downward pivotal movement of the pole connector 42, the sleeve flanged upper end portion 80 remains in contact with the cam 78.

As illustrated in FIG. 2, the flexible conduit 40 with the conductor 26 enclosed therein extends through the bore 50 of the pole connector socket end portion 46 and therefrom along an arcuate path through the passageway 48 of the connector pivot end portion 44. As the flexible conduit 40 extends through the passageway 48, an arcuate plate 112 of the pivot end portion 44 supports the conduit 40 as illustrated in FIG. 2. The conduit 40 extends into the upper open end portion 72 of the base member 12 and downwardly through the sleeve 82. The conduit 40 with the conductor 26 contained therein extends through the sleeve 82 and out the lower end portion thereof into the contactor box 56, as illustrated in FIG. 1. Thus, with this arrangement, the conductor 26 is sealingly enclosed within a protective housing along its entire path through the pole 10, the pole connector 42, and the base member 12 to the contactor box 56.

The base member 12 as illustrated in FIG. 1 is securely positioned in the opening 55 of the contactor box 56. The sleeve 82 is movable vertically in the base member 12; while, the conductor 26 and conduit 40 remain stationary as the pole 10 and pole connector 42 pivot about the pivot pin 70. With this arrangement, the conductor 26 is encased in a housing that prevents physical damage to the conductor 26 by exposure to the environment, and particularly the deleterious environment of an underground mine.

The conduit 40 and conductor 26 enter the contactor box 56, and the conductor 26 extends from the contactor box 56, as illustrated in FIG. 1, through an outlet 114 into a moisture proof conduit 116. The conduit 116 abuts in surrounding and sealing relation the outlet 114 and at the opposite end abuts in surrounding and sealing relation an inlet 118 of circuit breaker box 122 mounted on the vehicle frame 14. The electrical conductor 26 is connected to the circuit breaker 120 contained within the box 122. A circuit breaker adaptable for use with the present invention is a type HFM 100 ampere (150-480A magnetic trip) circuit breaker, manufactured by Westinghouse Electric Corporation.

From the circuit breaker 120 the conductor 26 returns through the moisture proof conduit 116 and back into the contactor box 56 where it is connected to the electrical circuitry (not shown) associated with the vehicle propulsion motor. The circuit breaker 120 is operable to interrupt current flow from the trolley wire 16 through the electrical conductor 26 to the electrical circuitry within the contact box 56. In normal operation, the circuit breaker 120 is maintained in a closed position permitting DC current to flow from the trolley wire 16 through the conductor 26 and circuit breaker 120 to the electrical circuitry of the propulsion motor.

In the event of a short or an overload, the circuit breaker 120 trips to open the circuit between the trolley wire 16 and the contact box 56 so that current does not flow through the conductor 26. This is particularly important to prevent an electrical hazzard and injury to operating personnel in the event of a short or an overload. To restore power to the conductor 26, the circuit breaker 120 is manually operated by a lever 124 in the conventional manner to return the circuit breaker 120 to a closed position.

As discussed above with the arrangement illustrated in FIG. 1, the contactor 26 extends along an enclosed, protective path through the flexible conduit 40 to the contactor box 56 and from the contactor box 56 through the sealed conduit 116 to the circuit breaker box 122. The conductor 26 then extends from the circuit breaker 120 back through the conduit 116 into the contactor box 56 where the conductor 26 is connected to the electrical circuitry of the vehicle propulsion motor. An alternative arrangement includes, the base member 12 mounted on the circuit breaker box 122, and the flexible conduit 40 and conductor 26 extend directly from the base member 12 into the circuit breaker box 122 for connection of the conductor 26 to the circuit breaker 120. In this embodiment, the conductor 26 passes through the moisture proof conduit 116 from the circuit breaker box 122 to the contactor box 56 for connection to the circuitry of the propulsion motor. In both embodiments, the conductor 26 is connected by the circuit breaker 120 to the circuitry of the propulsion motor. The conductor 26 remains sealed in a protective enclosure from the trolley pole 10 to the propulsion motor on the vehicle 15.

With the present invention the conventionally known fuse associated with a trolley pole is eliminated, thereby eliminating the possiblity of electrical shock to operating personnel when the current to the trolley pole is not interrupted before a blown fuse is changed. With the present invention, when the circuit breaker 120 trips or when a short or overload occurs, the flow of the current to the trolley pole 10 is automatically terminated. Restoring power to the propulsion motor is efficiently and safely accomplished once the cause of the fault is determined and corrected by manually returning the circuit breaker 120 to a closed position by the operation of switch layer 124.

According to the provisions of the patent statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:
1. A trolley pole assembly comprising,
a hollow pole having an upper end portion and a lower end portion,
a passageway extending the length of said pole from said upper end portion of said lower end portion,
a trolley wire contact shoe mounted on said pole upper end portion,
a base member adapted to support said pole for movement of said trolley wire contact shoe into and out of contact with a trolley wire,
said base member including a tubular housing having a bracket positioned adjacent said pole lower end portion, said tubular housing having a bore therethrough,
connector means for connecting said pole lower end portion to said base member, said connector means having a passageway communicating with said pole passageway at said pole lower end portion,
means for sealingly connecting said connector means to said pole lower end portion,
said connector means being pivotally connected at one end to said bracket and adapted at an opposite end to receive said pole lower end portion,
said base member tubular housing bore communicating in a sealed relation with said connector means passageway to provide an impact resistant enclosure extending from said pole upper end portion through said pole passageway to said pole lower end portion and therefrom through said communicating arrangement of said connector means passageway and said tubular housing bore,
an electrical conductor extending through said impact resistant enclosure from connection to said trolley wire contact shoe at said pole upper end portion through said pole passageway to said pole lower end portion,
said electrical conductor extending from said pole lower end portion through said connector means passageway and through said base member tubular housing bore,
a flexible conduit positioned in said impact resistant enclosure and having an upper end and a lower end, said upper end being positioned in said pole passageway,
said flexible conduit extending out of said pole lower end portion and through said connector means passageway to said base member, said flexible conduit extending through said base member tubular housing bore,
said flexible conduit forming an arcuate path through said connector means passageway to said tubular housing bore to guide said electrical conductor along said arcuate path as said electrical conductor extends through said impact resistant enclosure from said pole lower end portion, said connector means, and into said base member,
resilient means positioned within said base member tubular housing for applying an upward force upon said connector means to pivot said trolley pole upwardly for contact of said trolley wire contact shoe with the trolley wire,
said resilient means surrounding said flexible conduit having a lower end compressed against said base member and an upper end applying an upward force upon said connector means,
a sleeve member positioned in said base member between said resilient means and said flexible conduit,
said sleeve member having an upper end portion and a lower end portion,
said sleeve member upper end portion abutting said resilient means and urged into contact with said connector means to pivot said connector means on said base member to move said trolley pole to a raised position,
said sleeve member lower end portion extending through said base member and being extended and retracted relative to said base member upon expansion and contraction of said resilient means as said trolley pole is raised and lowered, and
said electrical conductor sealingly enclosed within said flexible conduit along the path of said electrical conductor through said impact resistant enclosure from said hollow trolley pole through said base member.

2. A trolley pole assembly as set forth in claim 1 which includes,
a vehicle frame,
a support housing mounted on said vehicle frame and adapted to enclose the circuitry associated with a propulsion motor,
said base member secured to said support housing, and
said flexible conduit lower end with said electrical conductor contained therein extending from said base member into said support housing for connection of said electrical conductor to the propulsion motor.

3. A trolley pole assembly as set forth in claim 1 in which said connector means includes,
a pivot end portion pivotally connected to said bracket and a socket end portion for receiving said pole lower end portion,
said connector means passageway extending from said socket end portion to said pivot end portion, and
said flexible conduit with said electrical conductor contained therein extending from said pole lower end portion through said connector means passageway from said socket end portion to said pivot end portion and into said base member.

4. A trolley pole assembly as set forth in claim 1 which includes,
a cam surface positioned on said connector means adjacent the pivotal connection of said connector means to said bracket, and
said resilient means applying an upward force upon said cam surface to urge said connector means to pivot on said bracket to move said pole to a raised position.

5. A trolley pole assembly as set forth in claim 1 which includes,
locking means pivotally connected to said bracket for movement into contact with said connector means to maintain said connector means in a preselected pivoted position on said base member for selective positioning of said pole.

6. A trolley pole assembly as set forth in claim 1 which includes,
an arcuate plate connected to said connector means within said connector means passageway for supporting said flexible conduit along said arcuate path through said connector means passageway, and
said flexible conduit providing a sealed enclosure for receiving said electrical conductor to prevent exposure of said electrical conductor to the effects of physical damage.

7. A trolley pole assembly comprising,
a hollow pole having an upper end portion and a lower end portion,
a passageway extending the length of said pole from said upper end portion to said lower end portion,
a trolley wire contact shoe mounted on said pole upper end portion,
a base member adapted to support said pole for movement of said trolley wire contact shoe into and out of contact with a trolley wire,
said base member including a tubular housing having a bracket positioned adjacent said pole lower end portion,
connector means for connecting said pole lower end portion to said base member,
said connector means being pivotally connected at one end to said bracket and adapted at an opposite end to receive said pole lower end portion,
an electrical conductor extending from connection to said trolley wire contact shoe at said pole upper end portion through said pole passageway to said pole lower end portion,
said electrical conductor extending from said pole lower end portion through said connector means and through said base member,
a flexible conduit having an upper end and a lower end, said upper end being positioned in said pole passageway,
said flexible conduit extending out of said pole lower end portion and through said connector means to said base member, said flexible conduit extending through said base member,
said electrical conductor sealingly enclosed within said flexible conduit along the path of said electrical conductor from said hollow trolley pole through said base member,
resilient means positioned within said base member tubular housing for applying an upward force upon said connector means to pivot said trolley pole upwardly for contact of said trolley wire contact shoe with the trolley wire,
said resilient means surrounding said flexible conduit and having a lower end compressed against said base member and an upper end applying an upward force upon said connector means,
said resilient means including a coiled spring,
a sleeve member positioned in said base member between said coiled spring and said flexible conduit,
said sleeve member having an upper end portion and a lower end portion,
said sleeve upper end portion abutting said coiled spring and urged into contact with said connector means to pivot said connector means on said base member to move said trolley pole to a raised position, and
said sleeve lower end portion extending through said base member and being extended and retracted relative to said base member upon expansion and contraction of said coiled spring as said trolley pole is raised and lowered.

8. A trolley pole assembly as set forth in claim 7 which includes,
a cam surface positioned on said connector means adjacent the pivotal connection of said connector means to said bracket,
said coiled spring maintaining said sleeve member upper end portion in contact with said cam surface to exert an upward pivoting force upon said trolley pole to move said trolley pole to a raised position, and
said connector means being pivotal to move said cam surface to apply a downward force upon said sleeve member upper end portion to compress said coiled spring to move said trolley pole to a lowered position.

9. A trolley pole assembly as set forth in claim 7 in which,
said sleeve member is vertically movable in said base member upon expansion and contraction of said coiled spring, and
said flexible conduit together with said electrical conductor being maintained stationary relative to said sleeve member as said connector means pivots to raise and lower said trolley pole.

10. A trolley pole assembly as set forth in claim 7 in which, said connector means includes a passageway communicating with said pole passageway at said pole lower end portion, said base member including a bore therethrough, said base member bore communicating with said connector means passageway to form an impact resistant enclosure extending from said pole upper end portion through said pole passageway to said pole lower end portion and therefrom through said connector means passageway and said base member bore, and said flexible conduit forming an arcuate path through said connector means passageway to said base member bore to guide said electrical conductor along said arcuate path through said impact resistant enclosure.

11. A method for sealing an electrical conductor within a pivotally mounted trolley pole comprising the steps of, extending an electrical conductor through a moisture and impact resistant enclosure from connection to a trolley wire contact shoe through a passageway of a trolley pole, connecting the trolley pole to a connector means, pivotally mounting the connector means to a base member supported on a vehicle, positioning a flexible conduit in an arcuate path extending out of the trolley pole through the connector means and into the base member, extending the electrical conductor through the enclosure being formed by the flexible conduit from a lower end of the trolley pole through the connector means and the base member, supporting the electrical conductor by the flexible conduit along the arcuate path from the trolley pole through the connector means into the base member, pivoting the connector means to move the trolley pole between a raised and lowered position, positioning a spring biased sleeve within the base member in surrounding relation with the flexible conduit, maintaining the sleeve in contact with the connector means to exert an upward pivoting force on the connector means to urge the trolley pole upwardly to the raised position, vertically moving the sleeve in the base member to permit pivotal movement of the connector means to raise the lower the trolley pole, and maintaining the flexible conduit and the electrical connector fixed relative to the sleeve as the connector means and the trolley pole pivot on the base member.

* * * * *